United States Patent
Hale et al.

(10) Patent No.: US 7,725,415 B2
(45) Date of Patent: May 25, 2010

(54) PROCESS AND HEURISTIC STATISTIC FOR PROSPECT SELECTION THROUGH DATA MINING

(75) Inventors: Curtis Richard Hale, Dunwoody, GA (US); John Baxter Rollins, Southlake, TX (US)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 12/139,649

(22) Filed: Jun. 16, 2008

(65) Prior Publication Data

US 2008/0249971 A1    Oct. 9, 2008

Related U.S. Application Data

(63) Continuation of application No. 10/742,099, filed on Dec. 19, 2003.

(51) Int. Cl.
G06F 17/00 (2006.01)
G06F 19/00 (2006.01)

(52) U.S. Cl. .......................................... 706/46; 705/10
(58) Field of Classification Search .................. 706/45, 706/46; 705/1, 10, 14, 26; 709/203
See application file for complete search history.

(56) References Cited

U.S. PATENT DOCUMENTS

| | | | |
|---|---|---|---|
| 5,644,723 A | 7/1997 | Deaton | |
| 5,687,322 A | 11/1997 | Deaton et al. | |
| 5,774,868 A | 6/1998 | Cragun et al. | |
| 5,848,396 A | 12/1998 | Gerace | |
| 5,937,392 A | 8/1999 | Alberts | |
| 5,974,393 A | 10/1999 | McCullough et al. | |
| 5,974,396 A | 10/1999 | Anderson et al. | |
| 6,012,051 A | 1/2000 | Sammon et al. | |
| 6,061,658 A | 5/2000 | Chou et al. | |
| 6,088,722 A | 7/2000 | Herz et al. | |
| 6,236,977 B1 * | 5/2001 | Verba et al. | 705/10 |
| 6,236,985 B1 | 5/2001 | Aggarwal et al. | |
| 6,298,348 B1 | 10/2001 | Eldering | |

(Continued)

OTHER PUBLICATIONS

Customer Targeting: A Neural Network Approach Guided by Genetic Algorithms YongSeog Kim, W Nick Street, Gary J Russell, Filippo Menczer. Management Science. Linthicum: Feb. 2005. vol. 51, Iss. 2; p. 264 (13 pages).*

(Continued)

Primary Examiner—David R Vincent
Assistant Examiner—Ola Olude-Afolabi
(74) Attorney, Agent, or Firm—Delizio Law PLLC (57) ABSTRACT

Method, system, and article of manufacture for selecting prospects for a product promotion though data mining. An initial set of prospects in a customer database is identified, by data mining, as initially identified prospects based on predetermined selection criteria. The number of initially identified prospects is compared to a target number of prospects. When the number of initially identified prospects matches the target number of prospects, the initially identified prospects are utilized as the final selection of prospects. When the number of initially identified prospects mismatches the target number of prospects, the final selection of prospects is determined by performing a culling process or an augmenting process to reduce or increase, respectively, the initial set of prospects using a heuristic measure H, until the number of prospects in the initial set of prospects matches the target number of prospects.

57 Claims, 3 Drawing Sheets

U.S. PATENT DOCUMENTS

| | | | |
|---|---|---|---|
| 6,496,814 | B1 | 12/2002 | Busche |
| 6,529,948 | B1* | 3/2003 | Bowman-Amuah ......... 709/217 |
| 6,567,786 | B1 | 5/2003 | Bibelnieks et al. |
| 6,571,216 | B1 | 5/2003 | Garg et al. |
| 6,578,011 | B1 | 6/2003 | Forward |
| 6,853,982 | B2 | 2/2005 | Smith et al. |
| 7,113,917 | B2 | 9/2006 | Jacobi et al. |
| 7,177,851 | B2 | 2/2007 | Afeyan et al. |
| 7,200,607 | B2 | 4/2007 | Downs |
| 7,212,990 | B1* | 5/2007 | Greden et al. .................. 705/26 |
| 2002/0016935 | A1 | 2/2002 | Bergsten et al. |
| 2002/0042739 | A1 | 4/2002 | Srinivasan et al. |
| 2002/0087387 | A1* | 7/2002 | Calver et al. .................. 705/10 |
| 2002/0169764 | A1 | 11/2002 | Kincaid et al. |
| 2003/0033242 | A1* | 2/2003 | Lynch et al. .................. 705/38 |
| 2003/0061202 | A1 | 3/2003 | Coleman |
| 2003/0101063 | A1* | 5/2003 | Sexton et al. .................. 705/1 |
| 2003/0172374 | A1 | 9/2003 | Vinson et al. |
| 2003/0212619 | A1 | 11/2003 | Jain et al. |
| 2004/0103041 | A1* | 5/2004 | Alston .......................... 705/26 |
| 2006/0190396 | A1* | 8/2006 | Winterhalder ................ 705/39 |
| 2007/0219851 | A1* | 9/2007 | Taddei et al. .................. 705/10 |

OTHER PUBLICATIONS

An intelligent system for customer targeting: a data mining approach YongSeog Kim, W Nick Street. Decision Support Systems. Amsterdam: May 2004. vol. 37, Iss. 2; p. 215.*

IBM Technical Disclosure Bulletin, vol. 40, No. 02, Feb. 1997—Intelligent Miner; R. Agrawal, et al.

M. Setnes et al., "Fuzzy Modeling of Client Preference from Large Data Sets: An Application to Target Selection in Direct Marketing," IEEE Transaction on Fuzzy Systems, Feb. 2001, 11 pages, vol. 9, No. 1.

M. Viswanathan et al., "Understanding How Product Attributes Influence Product Categorization: Development and Validation of Fuzzy Set-Based Measures of Gradedness in Product Categories," Journal of Marketing Research, Feb. 1999, pp. 75-94, vol. XXXVI.

"New Product Development", *Wikipedia* http://en.wikipedia.org/wiki/New_product_development (Date obtained Nov. 1, 2007), pp. 4-7.

Cox, Earl , "Fuzzy Logic and The Measures of Certainty in eCommerce Expert Systems", *PC AI* vol. 15, Issue 3 (May 2001) , pp. 16-22.

Grasso, Jonathan et al., "Heuristic Rules", *Social Psychology in Advertising* http:72.14.253.104/search?q=cache:aAvo0WzTk-MJ:www.cortland.edu/psych/ads/heur.html (Date Obtained Nov. 6, 2007) Google's cache of www.cortland.edu/psych/ads/heur.html as retrieved on Oct 9, 2007. 1999.

Koen, Peter A. et al., "Fuzzy Front End", *The PDMA ToolBook for New Product Development* Apr. 20, 2002 , pp. 5-35.

* cited by examiner

PROCESS AND HEURISTIC STATISTIC FOR PROSPECT SELECTION THROUGH DATA MINING

CROSS REFERENCE TO RELATED APPLICATIONS

This application is a continuation of pending U.S. application Ser. No. 10/742,099 filed on Dec. 19, 2003, the disclosure of which is incorporated herein by reference.

CROSS REFERENCE TO RELATED APPLICATION

This application is related to co-pending U.S. patent application Ser. No. 10/144,125 titled "Targeting Customers," filed May 10, 2002 by different inventors, which is assigned to the same assignee as the present application.

BACKGROUND OF THE INVENTION

1. Field of the Invention

The present invention is directed to a method, system, and article of manufacture for prospect selection using a heuristic statistic when culling or augmenting a prospect list for a given promotion.

2. Description of the Prior Art

Consumer Packaged Goods (CPG) manufacturers pay retail firms to promote their products. Typically, a CPG manufacturer specifies a number of prospects fitting specific criteria to target in a particular promotion to be conducted by a retailer. Using the CPG manufacturer's selection criteria, the retailer queries its customer database (e.g., loyalty card holders) to identify prospective targets. The CPG manufacturer pays the retailer on a per-prospect basis to conduct the promotion. Promotional revenue from sales by the retailer varies according to the number of prospects that the CPG manufacturer targets that the retailer can supply. The process of compiling a list of prospective customers to target in a promotion is known as prospecting.

The problem that the retailer faces in prospecting is that, in general, applying the CPG manufacturer's selection criteria to the retailer's customer database will result in either too many or too few prospects being identified for a given promotion. The retailer is then faced with the problem of either culling prospects in the case of too many prospects, or identifying additional prospects to supplement the initially selected prospect list in the case of too few prospects, in order to meet the desired number of prospects for the promotion. The process of culling or supplementing is manual, laborious and time-consuming, and may not produce the highest-potential list of prospects in terms of expected responsiveness to the promotion.

According to one prior-art solution, after compiling the initial list of prospects through querying its customer database using selection criteria provided by the CPG manufacturer, the retailer determines whether the initial selection has yielded too many or too few prospects for the respective promotion. If too many have been selected, then the list is culled by some ad hoc method, e.g., eliminating those whose customer loyalty card ends in, for instance, 5 or 9. If too few have been selected, then the retailer meets with the CPG manufacturer to try to negotiate a relaxation in the selection criteria, and then determines whether the relaxed criteria generate enough additional prospects to meet the specified number.

If the prospect list must be culled in order to reduce the number of prospects, typical ad hoc methods do not ensure that the highest-potential prospects are retained. As a result, overall response to the promotion may be substantially less than optimal.

If the prospect list must be augmented, and if relaxed selection criteria do not generate a sufficient number of additional prospects, or if the CPG manufacturer decides against relaxing the criteria, then the size of the promotion must be reduced. As a result, the retailer realizes less promotional revenue and reduced sales boost from the promotion. Furthermore, the CPG manufacturer's selection criteria may be based on "best guess" and hence may not identify the highest-potential prospects, again resulting in a less than optimal to the promotion.

It is therefore desirable to provide an improved method, system, and article of manufacture for prospect selection, using a heuristic statistic, when culling or augmenting a prospect list for a given promotion.

BRIEF SUMMARY OF THE INVENTION

In accordance with the present invention, there is provided a method, system and computer program product for identifying a final selection of prospects from a customer database containing a plurality of prospects for a product promotion. An initial set of prospects is identified as initially identified prospects by data mining in a customer database, based on predetermined selection criteria. The final selection of prospects is determined by performing a culling process or an augmenting process to reduce or increase, respectively, the initial set of prospects using a heuristic measure H, until the number of prospects in the initial set of prospects matches the predetermined target number of prospects.

In accordance with another aspect of the present invention, there is provided a method, system and computer program product for identifying a final selection of prospects from a customer database containing a plurality of prospects for a product promotion. An initial set of prospects is identified as initially identified prospects by data mining in a customer database, based on predetermined selection criteria. The number of the initially identified prospects is compared to a target number of prospects and, when the number of initially identified prospects matches the target number of prospects, the initially identified prospects are utilized as the final selection of prospects. When, however, the number of initially identified prospects mismatches the target number of prospects, the final selection of prospects is determined by performing a culling process or an augmenting process to reduce or increase, respectively, the initial set of prospects using a heuristic measure H, until the number of prospects in the initial set of prospects matches the predetermined target number of prospects.

In accordance with yet another aspect of the present invention, the culling process includes ranking each prospect of the initial set by a heuristic measure H and selecting prospects from the initial set in order of H for the final selection of prospects until the target number is matched.

In accordance with still another aspect of the present invention, the augmenting process includes ranking each remaining customer of the database not selected for the initial set by a heuristic measure H and selecting prospects for addition to the initial set from the remaining customers in order of H for the final selection of prospects until the target number is matched.

One advantage obtained from the present invention is that it provides an easier to use method for selecting prospects than prior art ad hoc methods.

Another advantage obtained from the present invention is that it is a lower cost, less time-intensive method than prior art methods.

Yet another advantage obtained from the present invention is a reduction in the number of highly skilled analysts required compared to prior art methods and systems.

Other advantages of the subject method, system, and article of manufacture will become apparent to those skilled in the art upon a reading and understanding of this specification.

BRIEF DESCRIPTION OF THE DRAWINGS

The invention may take physical form in certain parts and steps and arrangements of parts and steps, the embodiments of which will be described in detail in this specification and illustrated in the accompanying drawings hereof and wherein.

DETAILED DESCRIPTION OF THE INVENTION

Reference will now be made in detail to an embodiment of the present invention, examples of which are illustrated in the accompanying drawings. The detailed description that follows is presented in terms of general procedures, steps and symbolic representations of operations of data bits within a computer memory, associated computer processors, networks, and network devices. These procedure descriptions and representations are the means used by those skilled in the data processing art to convey the substance of their work to others skilled in the art. A procedure is here, and generally, conceived to be a self-consistent sequence of steps or actions leading to a desired result. Thus, the term "procedure" is generally used to refer to a series of operations performed by a processor, be it a central processing unit of a computer, or a processing unit of a network device, and as such, encompasses such terms of art as "objects," "functions," "subroutines" and "programs."

The procedures presented herein are not inherently related to any particular computer or other apparatus. In particular, various general-purpose machines may be used with programs in accordance with the teachings herein, or it may prove more convenient to construct more specialized apparatus to perform the required method steps.

However, one of ordinary skill in the art will recognize that a variety of platforms and languages exist for creating software for performing the procedures outlined herein. One of ordinary skill in the art also recognizes that the choice of the exact platform and language is often dictated by the specifics of the actual system constructed, such that what may work for one type of general purpose computer may not be efficient on another type of general purpose computer.

One of ordinary skill in the art to which this invention belongs will have a reasonable understanding of data mining techniques. It being recognized that such practitioners do not require specific details of the software, but rather find data structure descriptions and process descriptions more desirable (due to the variety of suitable hardware and software platforms), such specifics are not discussed to avoid obscuring the invention.

According to one embodiment of the present invention, selected results from a data mining technique known as clustering are used to construct a "best fit" heuristic statistic, H, that takes into account the quality of fit of each database record to its assigned cluster, the confidence of that fit, and the quality of fit to the next best cluster. The clustering results are generated by an available data mining tool such as IBM's DB2 Intelligent Miner for Data or DB2 Modeling extender. The data mining tool outputs calculated measurements including an assigned cluster identifier (ID), a next-best cluster ID, and a confidence value of assigned fit for each record.

According to a preferred embodiment, the heuristic statistic is calculated for each record as follows:

$$H = \text{Confidence} \times \text{Score1} \div \text{Score2} \text{ where:}$$

Confidence is a measure of certainty that the record has been assigned to the best cluster, $0 \leq \text{Confidence} \leq 1$, where 0 is the lowest certainty, Score1 is a measure of how well the record fits in its assigned cluster, $0 \leq \text{Score1} \leq 1$, with 0 representing the poorest fit, and Score2 is a measure of how well the record fits in the next-best cluster, $0 \leq \text{Score2} \leq 1$, with 0 representing the poorest fit.

H has the desirable property of having a higher value (better fit) when the record more clearly belongs to the assigned cluster (higher Confidence), the record is closer to the center of its assigned cluster (higher Score1), and the record is farther away from the center of the next-best cluster (lower Score2). H has a lower bound of 0 and no upper bound. Alternate definitions of H, Confidence, Score1, and Score2 having properties similar to the above-described property, and similar effects as described herein may, of course, be used as desired, and are intended to fall within the scope of the present invention.

Figure 1:
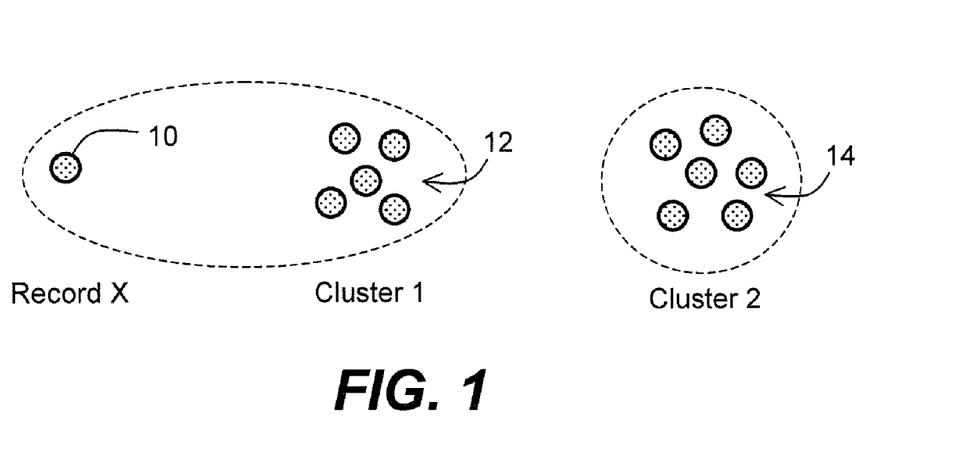
FIG. 1 is a graphical depiction of a first exemplary clustering scenario according to aspects of the present invention.
Figure 2:
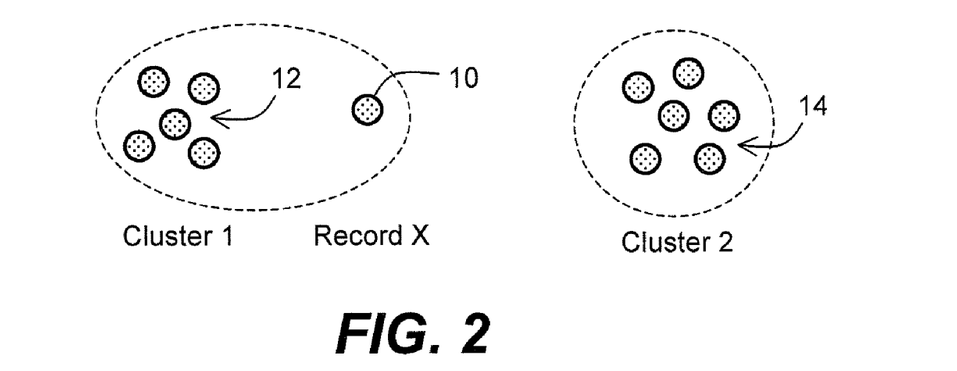
FIG. 2 is a graphical depiction of a second exemplary clustering scenario according to aspects of the present invention.

The rationale for the heuristic static, H, is illustrated graphically in FIGS. 1-2. With reference to FIG. 1, a first scenario is depicted wherein a prospect database record 10, labeled record X, is assigned with high confidence to a first cluster 12, labeled cluster 1. Record X is assigned with high confidence to cluster 1 because there is no competing cluster near to record X; the second cluster 14, labeled cluster 2, is too distant from record X to be considered a competing cluster. Even though record X is not near to the center of the first cluster 12 (low Score1), it is assigned to the first cluster because there are no competing clusters.

With reference now to FIG. 2, where like numerals represent like entities, a second scenario is depicted wherein the prospect database record 10 (record X) is assigned with low confidence to the first cluster 12 (cluster 1) because there is a competing second cluster 14 cluster 2). The second cluster 14 is more distant from record X than is the first cluster 12, but it is close enough to be considered a competing cluster. In this instance, the prospect record X has a higher Score1 than the first-presented scenario, owing to being nearer to the center of cluster 1, its assigned cluster.

Figure 3:
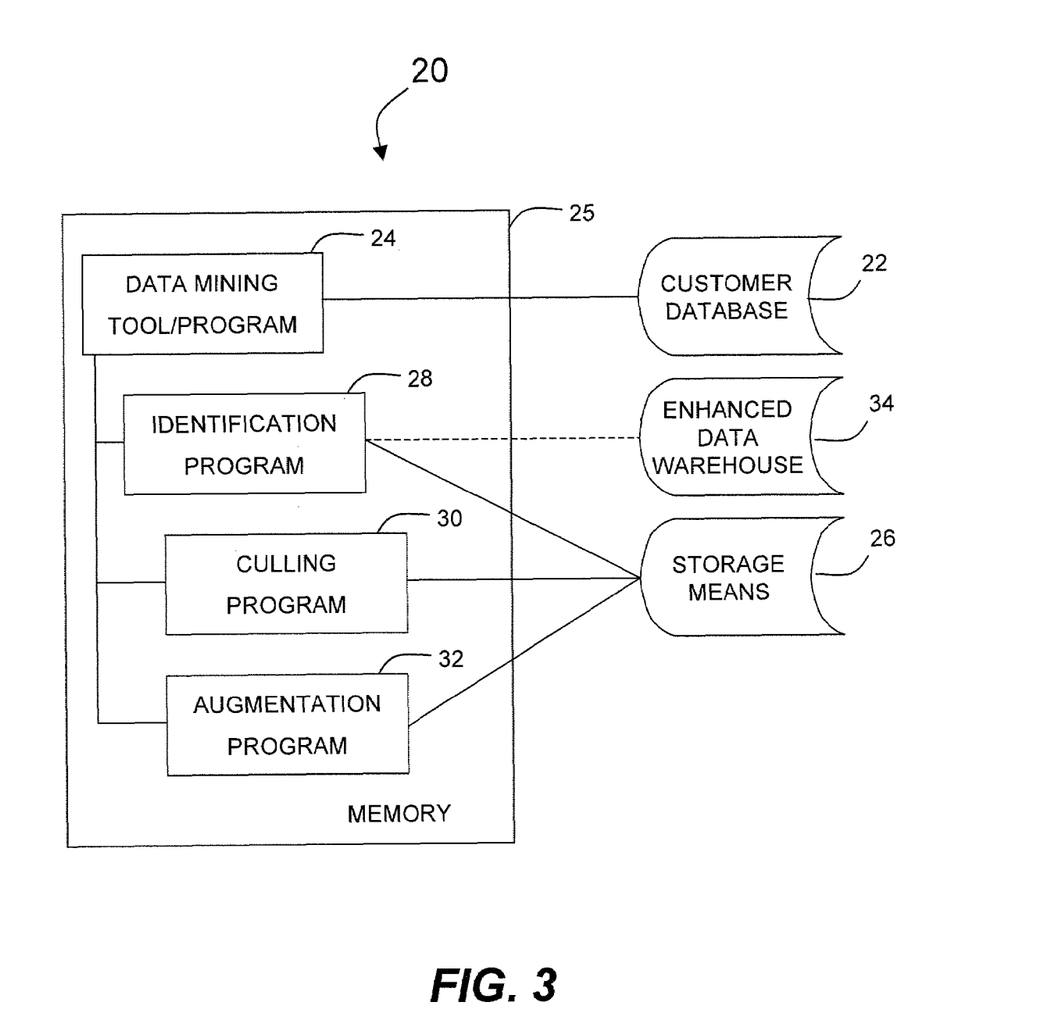
FIG. 3 is a schematic representation of a system suitable for practicing aspects of the present invention.

In describing an embodiment of the present invention, with reference to FIG. 3, it is assumed that a retailer has access via a system 20 to a customer database 22 with such attributes such as, for example, customer demographics and purchases by category and product class. It is further assumed that a data mining tool 24 such as, for instance, IBM's DB2 Intelligent Miner for Data or DB2 Modeling extender is available, shown running in a memory 25 on the system 20. It is further assumed that the data mining tool 24 is capable of outputting, to a storage means 26 and/or to the memory 25, calculated information including cluster ID, assigned cluster, next-best cluster, and confidence of assigned fit for each customer. The system will include a customer identification process 28, a culling process 30 and an augmentation process 32 which are described in further detail below. The system 20 may also optionally include an enhanced data warehouse 34, also described in further detail below.

Figure 4:
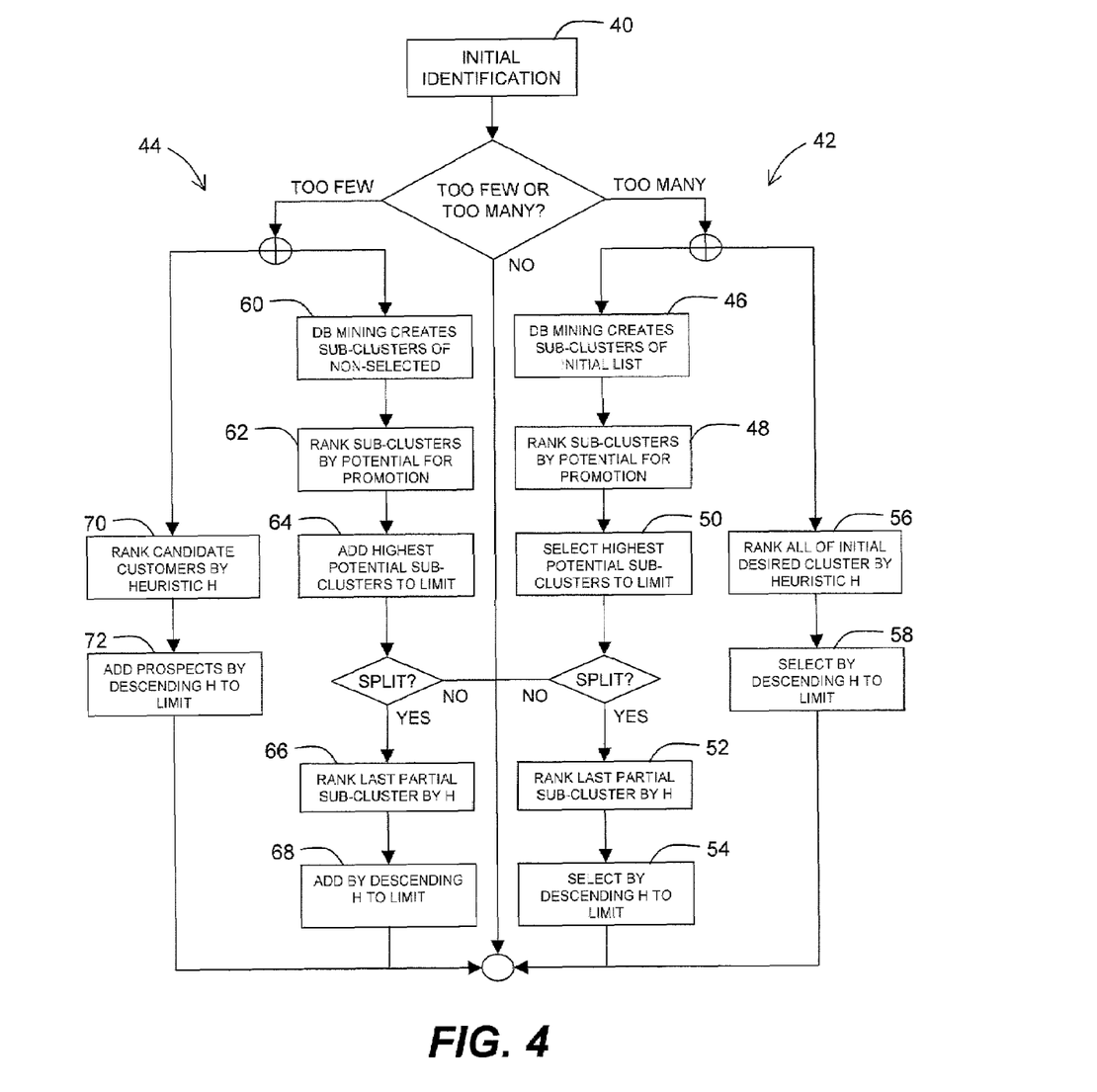
FIG. 4 is a flowchart of a method according to the present invention.

With reference now to FIG. 4, a first step 40, prior to any culling or augmentation processes 42,44, is the initial identification of prospects (40) using CPG selection criteria. Criteria (customer attributes) are provided by the CPG manufacturer to select a target group for a given promotion. A retailer handling the CPG promotion queries its customer database (e.g., loyalty card holders) to identify the initial group of prospects (desired cluster) for the promotion.

In general, the desired cluster will contain either too many or too few prospects being identified for a given promotion. This is because the number of prospects that the CPG manufacturer wants to target is based on an arbitrary number, e.g., 100,000, with an associated promotional budget, not on an understanding of the actual number of customers who have the specified attributes. The desired cluster is normally either decreased (too many prospects initially) or increased (too few prospects initially) to attain the number of prospects that the CPG manufacturer wants to target.

Following the initial identification of prospects (40), the prospect list undergoes a culling process (42) if too many are initially identified in the desired cluster. Using the data mining technique known as clustering, a model is created using the members of the desired cluster to produce one or more sub-clusters (46) that describe the different behavioral and characteristic profiles of the respective cluster member customers. Either of two approaches may be utilized for the culling process, depending on the preference or objectives of the CPG manufacturer.

In the first approach to culling, the sub-clusters are reviewed with the CPG manufacturer and ranked (48) according to their potential (expected responsiveness) for the given promotion, in terms of demographics and behavioral characteristics. Prospects are selected 50 from the highest-potential sub-clusters until the desired limit is approached (given that sub-clusters contain discrete numbers of customers). If the limit is reached midway in a sub-cluster, the members of that sub-cluster are ranked (52) by the heuristic statistic, H. From the ranked list of members of the sub-cluster in question, prospects are selected (54) in descending order of H until the prospect limit is reached.

In the second approach, all members of the desired cluster are ranked (56) using the heuristic statistic, H. Prospects from the ranked list are selected (58) until the desired limit is reached.

The prospect list now consists of a subset of the initial desired cluster. This subset can be expected to consist of a more desirable subset of the original desired cluster than would have resulted from culling by ad hoc means, resulting in higher overall responsiveness of the prospect group to the promotion.

If the initial prospect list contains too few prospects in the desired cluster, an augmentation process is undertaken. A clustering model is created using the members of the desired cluster. The customer information is optionally enriched with additional information from the customer database and/or from third-party data sources which can be particularly helpful in this case, by providing additional customer characteristics for clustering. The clustering model is applied to some or all of the customer database records that are not already included in the desired cluster to produce (60) one or more candidate sub-clusters that describe profiles of the respective sub-cluster member customers.

If only some of these records are chosen, then they may be selected randomly, or by other criteria, to ensure a representative sample. Application of the model to the chosen records (either some or all not already included in the desired cluster) generates the candidate sub-clusters. The model enables the identification of sub-clusters of prospects that are most similar to the desired cluster but did not meet the original selection criteria. As with the culling process, either of two approaches may be taken for augmenting the prospect list.

In the first augmentation approach, the candidate sub-clusters are reviewed with the CPG manufacturer and ranked (62) according to their potential (expected responsiveness) for the given promotion, in terms of demographics and behavioral characteristics. Prospects are selected (64) from the highest-potential sub-clusters and added to the initially selected desired cluster until the desired limit is approached. If the limit is reached midway in a sub-cluster, then the members of that sub-cluster, or any particular sub-cluster, are ranked (66) by the heuristic statistic, H. From the ranked list of members of the sub-cluster in question, prospects are selected (68) in descending order of H and added to the desired cluster until the prospect limit is reached. Further, the invention is not limited to selecting in descending order of H. Alternate formulations of H having the desired properties can be incorporated wherein selecting on an ascending order of H would be appropriate.

In the second augmentation approach, all of the additional candidate customers are ranked (70) using the heuristic statistic, H, without regard to the sub-clusters. Prospects are then selected (72) from the ranked list until the target number is reached.

The prospect list now consists of the desired cluster plus a subset of additional prospects. These additional prospects can be expected to exhibit better responsiveness to the promotion than a subset selected by ad hoc means, resulting in higher overall responsiveness of the prospect group to the promotion.

By discovering logical segments of additional customers, clustering provides a rationale for the CPG to expand the size of the promotion.

By discovering logical customer segments that can lead to higher overall potential responsiveness to a given promotion, clustering further provides a substantive rationale for the CPG manufacturer to expand the size of the promotion beyond the initially planned size. This can be done by including more prospects from the original desired cluster or expanding the prospect list beyond the original desired cluster through applying the clustering model to part or all of the remaining total customer database.

Although data mining techniques are sometimes used by retailers to select prospects for promotional campaigns, such analyses generally require highly skilled analysts to perform ad hoc studies on a per-campaign basis. This ad hoc approach tends to be expensive and, hence, may be suitable only for very large-scale promotions. Consequently, either hiring in-house experts or engaging outside consultants is often not cost-effective. As a result, the benefits of a data mining-based, ad hoc approach to prospect selection may not be attainable for many retailers. The present invention provides a lower-cost, more accessible, easier-to-use approach to prospect identification.

In optional embodiments, the above-described prospect identification process can form a foundation to evolve a retailer's customer database into an enhanced enterprise data warehouse (EDW), preferably on a distributed platform. The EDW is thereby designed to prepare, deliver, and update the customer database in accordance with this process, facilitating the identification process application to new promotions and reducing the execution time thereof. The prospect identification process may also be effectively implemented as an application accessed through a portal, facilitating its usage by category managers and analysts.

Other advanced technologies may also be implemented as part of the identification process as well. For example, Materialized Query Tables (MQTs) can form the basis for an advanced analytical platform including, e.g., data mining, OLAP, and query using DB2 Cube Views.

The invention has been described with reference to the preferred embodiments. Modifications and alterations will occur to others upon a reading and understanding of the specification. It is our intention to include all such modifications and alterations insofar as they come within the scope of the appended claims, or the equivalents thereof.

Having thus described our invention, we now claim:

1. A method of identifying a final selection of prospects from a customer database containing a plurality of prospects for a product promotion, the method comprising:
    using a data mining technique, identifying an initial set of prospects in a customer database as initially identified prospects; and,
    determining the final selection of prospects by performing one of a culling process and an augmenting process to, respectively, remove initially identified prospects from or add additional prospects of said customer database to the initial set of prospects using a heuristic measure H, until a count of prospects in said initial set of prospects matches a predetermined target number of prospects.

2. The method as set forth in claim 1, further including:
    comparing the count of said initially identified prospects in said initial set of prospects to said target number of prospects;
    when the count of initially identified prospects matches the target number of prospects, utilizing the initially identified prospects as the final selection of prospects; and,
    when the count of initially identified prospects mismatches the target number of prospects, determining the final selection of prospects by performing said one of the culling process and the augmenting process to, respectively, remove initially identified prospects from or add additional prospects of said customer database to the initial set of prospects using said heuristic measure H, until a count of prospects in said initial set of prospects matches a predetermined target number of prospects.

3. The method as set forth in claim 2, wherein:
    said identifying includes:
        using said data mining technique to identify at least one assigned cluster for each prospect of said initial set of prospects; and,
        using said data mining technique to identify at least one next-best cluster for each prospect of said initial set of prospects; and,
    said culling and augmenting processes include calculating said heuristic measure H by providing: a confidence factor (Confidence) which is a measure of certainty that the prospect has been assigned to a best cluster; a first score factor (Score1) which is a measure of how well the prospect fits in its assigned cluster; and a second score factor (Score2) which is a measure of how well the prospect fits in a next-best cluster.

4. The method as set forth in claim 3, wherein:

the heuristic $H=\text{Confidence}\times\text{Score1}\div\text{Score2}$.

5. The method as set forth in claim 4, wherein:
    $0\leq\text{Confidence}\leq1$, and 0 is a lowest certainty;
    $0\leq\text{Score1}\leq1$, and 0 represents a poorest best fit; and
    $0\leq\text{Score2}\leq1$, and 0 represents a poorest next-best fit.

6. The method as set forth in claim 2, wherein said culling process includes:
    ranking each prospect of said initial set of prospects by said heuristic measure H; and
    selecting prospects from said initial set of prospects in order of H for the final selection of prospects until the target number is matched.

7. The method as set forth in claim 6, wherein the selecting prospects from the initial set in order of H includes selecting prospects from the initial set in descending order of H.

8. The method as set forth in claim 2, wherein the culling includes:
    creating one or more sub-clusters of the initial set by utilizing said data mining technique;
    ranking the sub-clusters by a respective potential for the promotion;
    selecting from the sub-clusters in descending order of potential for the final selection of prospects until the target number is matched or would be exceeded by the last-selected sub-cluster; and
    when the target number is not matched:
        ranking each prospect of a particular sub-cluster by said heuristic measure H; and
        selecting prospects from the particular sub-cluster in order of H for the final selection of prospects until the target number is matched.

9. The method as set forth in claim 8, wherein:
    the selecting prospects from the particular sub-cluster in order of H includes selecting prospects from the particular sub-cluster in descending order of H.

10. The method as set forth in claim 8, wherein:
    the ranking each prospect of a particular sub-cluster by said heuristic measure H includes ranking each prospect of the last-selected sub-cluster by said heuristic measure H.

11. The method as set forth in claim 2, wherein said augmenting process includes:
    ranking prospects of the database not selected for inclusion in the initial set of prospects by said heuristic measure H as ranked prospects; and
    selecting from the ranked prospects and adding the selected ranked prospects to the initial set in order of H for the final selection of prospects until the target number is matched.

12. The method as set forth in claim 11, wherein the selecting from the ranked prospects for addition to the initial set in order of H includes selecting from the ranked prospects for addition to the initial set in descending order of H.

13. The method as set forth in claim 2, wherein the augmenting process includes:
    creating one or more sub-clusters of the remaining non-selected database prospects by data mining;
    ranking the sub-clusters by a respective potential for the promotion;
    selecting from the sub-clusters in descending order of potential for addition to the initial set as the final selection of prospects until the target number is matched or would be exceeded by the last-selected sub-cluster; and when the target number is not matched:
  ranking each prospect of a particular sub-cluster by a heuristic measure H; and
  selecting prospects from the particular sub-cluster in order of H for addition to the initial set as the final selection of prospects until the target number is matched.

14. The method as set forth in claim 13, wherein:
the selecting prospects from the particular sub-cluster in order of H includes selecting prospects from the particular sub-cluster in descending order of H.

15. The method as set forth in claim 13, wherein:
the ranking each prospect of a particular sub-cluster by a heuristic measure H includes ranking each prospect of the last-selected sub-cluster by a heuristic measure H.

16. The method as set forth in claim 2, wherein:
said culling process includes:
  ranking each prospect of the initial set by a heuristic measure H; and
  selecting prospects from the initial set in order of H for the final selection of prospects until the target number is matched; and,
said augmenting process includes:
  ranking each remaining prospect of the database not selected for the initial set by a heuristic measure H; and
  selecting prospects for addition to the initial set from the remaining prospects in descending order of H for the final selection of prospects until the target number is matched.

17. The method as set forth in claim 16 wherein the heuristic H comprises:
  a confidence factor (Confidence) which is a measure of certainty that the prospect has been assigned to a best cluster;
  a first score factor (Score 1) which is a measure of how well the prospect fits in its assigned cluster; and
  a second score factor (Score2) which is a measure of how well the prospect fits in a next-best cluster.

18. The method as set forth in claim 17, wherein:

the heuristic $H=\text{Confidence} \times \text{Score1} \div \text{Score2}$.

19. The method as set forth in claim 18, wherein:
$0 \leq \text{Confidence} \leq 1$, and 0 is a lowest certainty;
$0 \leq \text{Score1} \leq 1$, and 0 represents a poorest best fit; and
$0 \leq \text{Score2} \leq 1$, and 0 represents a poorest next-best fit.

20. A system for identifying a final selection of prospects from a customer database containing a plurality of prospects for a product promotion, the system comprising:
  data mining means for identifying an initial set of prospects in a customer database as initially identified prospects by utilizing a data mining technique; and,
  means for determining the final selection of prospects by performing one of a culling process means and an augmenting process means to, respectively, remove initially identified prospects from or add additional prospects of said customer database to the initial set of prospects using a heuristic measure H, until a count of prospects in said initial set of prospects matches a predetermined target number of prospects.

21. The system for identifying a final selection of prospects as set forth in claim 20, further including:
  means for comparing the count of said initially identified prospects in said initial set of prospects to said target number of prospects;
  means for utilizing the initially identified prospects as the final selection of prospects when the count of initially identified prospects matches the target number of prospects; and,
  means for determining the final selection of prospects by performing said one of the culling process means and the augmenting process means when the count of initially identified prospects mismatches the target number of prospects to, respectively, remove initially identified prospects from or add additional prospects of said customer database to the initial set of prospects using said heuristic measure H, until the count of prospects in said initial set of prospects matches said target number of prospects.

22. The system for identifying a final selection of prospects as set forth in claim 21, wherein:
  said data mining means for identifying includes a data mining means to identify at least one assigned cluster for each prospect of said initial set of prospects and identify at least one next-best cluster for each prospect of said initial set of prospects; and,
  said culling process means and augmenting process means include means for calculating said heuristic measure H by providing:
    a confidence factor (Confidence) which is a measure of certainty that the prospect has been assigned to a best cluster;
    a first score factor (Score1) which is a measure of how well the prospect fits in its assigned cluster; and
    a second score factor (Score2) which is a measure of how well the prospect fits in a next-best cluster.

23. The system for identifying a final selection of prospects as set forth in claim 22, wherein:

the heuristic $H=\text{Confidence} \times \text{Score1} \div \text{Score2}$.

24. The system for identifying a final selection of prospects as set forth in claim 23, wherein:
$0 \leq \text{Confidence} \leq 1$, and 0 is a lowest certainty;
$0 \leq \text{Score1} \leq 1$, and 0 represents a poorest best fit; and
$0 \leq \text{Score2} \leq 1$, and 0 represents a poorest next-best fit.

25. The system for identifying a final selection of prospects as set forth in claim 21, wherein said culling process means includes:
  means for ranking each prospect of the initial set of prospects by said heuristic measure H; and
  means for selecting prospects from said initial set of prospects in order of H for the final selection of prospects until the target number is matched.

26. The system for identifying a final selection of prospects as set forth in claim 25, wherein the means for selecting prospects from the initial set in order of H includes means for selecting prospects from the initial set in descending order of H.

27. The system for identifying a final selection of prospects as set forth in claim 21, wherein the culling process means includes:
  means for creating one or more sub-clusters of the initial set by utilizing said data mining technique;
  means for ranking the sub-clusters by a respective potential for the promotion;
  means for selecting from the sub-clusters in descending order of potential for the final selection of prospects until the target number is matched or would be exceeded by the last-selected sub-cluster; and
  when the target number is not matched:
    means for ranking each prospect of a particular sub-cluster by said heuristic measure H; and means for selecting prospects from the particular sub-cluster in order of H for the final selection of prospects until the target number is matched.

28. The system for identifying a final selection of prospects as set forth in claim 27, wherein:
the means for selecting prospects from the particular sub-cluster in order of H includes means for selecting prospects from the particular sub-cluster in descending order of H.

29. The system for identifying a final selection of prospects as set forth in claim 27, wherein:
the means for ranking each prospect of a particular sub-cluster by said heuristic measure H includes means for ranking each prospect of the last-selected sub-cluster by said heuristic measure H.

30. The system for identifying a final selection of prospects as set forth in claim 21, wherein said augmenting process means includes:
means for ranking prospects of the database not selected for inclusion in the initial set of prospects by said heuristic measure H as ranked prospects; and
means for selecting from the ranked prospects and adding the selected ranked prospects to the initial set in order of H for the final selection of prospects until the target number is matched.

31. The system for identifying a final selection of prospects as set forth in claim 30, wherein the means for selecting prospects for addition to the initial set from the remaining prospects in order of H includes means for selecting prospects for addition to the initial set from the remaining prospects in descending order of H.

32. The system for identifying a final selection of prospects as set forth in claim 21, wherein the augmenting process means includes:
means for creating one or more sub-clusters of the remaining non-selected database prospects by data mining;
means for ranking the sub-clusters by a respective potential for the promotion;
means for selecting from the sub-clusters in descending order of potential for addition to the initial set as the final selection of prospects until the target number is matched or would be exceeded by the last-selected sub-cluster; and
when the target number is not matched:
means for ranking each prospect of a particular sub-cluster by a heuristic measure H; and
means for selecting prospects from the particular sub-cluster in order of H for addition to the initial set as the final selection of prospects until the target number is matched.

33. The system for identifying a final selection of prospects as set forth in claim 32, wherein:
the means for selecting prospects from the particular sub-cluster in order of H includes means for selecting prospects from the particular sub-cluster in descending order of H.

34. The system for identifying a final selection of prospects as set forth in claim 32, wherein:
the means for ranking each prospect of a particular sub-cluster by a heuristic measure H includes means for ranking each prospect of the last-selected sub-cluster by a heuristic measure H.

35. The system for identifying a final selection of prospects as set forth in claim 21, wherein:
said culling process means includes:
means for ranking each prospect of the initial set by a heuristic measure H; and means for selecting prospects from the initial set in order of H for the final selection of prospects until the target number is matched; and,
said augmenting process means includes:
means for ranking each remaining prospect of the database not selected for the initial set by a heuristic measure H; and
means for selecting prospects for addition to the initial set from the remaining prospects in descending order of H for the final selection of prospects until the target number is matched.

36. The system for identifying a final selection of prospects as set forth in claim 35 wherein the heuristic H comprises:
a confidence factor (Confidence) which is a measure of certainty that the prospect has been assigned to a best cluster;
a first score factor (Score1) which is a measure of how well the prospect fits in its assigned cluster; and
a second score factor (Score2) which is a measure of how well the prospect fits in a next-best cluster.

37. The system for identifying a final selection of prospects as set forth in claim 36, wherein:

the heuristic $H=\text{Confidence}\times\text{Score1}+\text{Score2}$.

38. The system for identifying a final selection of prospects as set forth in claim 37, wherein:
$0 \leq \text{Confidence} \leq 1$, and 0 is a lowest certainty;
$0 \leq \text{Score1} \leq 1$, and 0 represents a poorest best fit; and
$0 \leq \text{Score2} \leq 1$, and 0 represents a poorest next-best fit.

39. A computer program product comprising a computer usable medium having computer readable code embodied in said medium for use in identifying a final selection of prospects from a customer database containing a plurality of prospects for a product promotion, comprising:
data mining program code that identifies an initial set of prospects in a customer database as initially identified prospects by utilizing a data mining technique; and,
program code that determines the final selection of prospects by utilizing one of a culling process program code and an augmenting process program code to, respectively, remove initially identified prospects from or add additional prospects of said customer database to the initial set of prospects using a heuristic measure H, until a count of prospects in said initial set of prospects matches a predetermined target number of prospects.

40. The computer program product as set forth in claim 39, further including:
program code that compares the count of said initially identified prospects in said initial set of prospects to said target number of prospects;
program code that utilizes the initially identified prospects as the final selection of prospects when the count of initially identified prospects matches the target number of prospects; and,
program code that determines the final selection of prospects by utilizing said one of the culling process program code and the augmenting process program code when the count of initially identified prospects mismatches the target number of prospects to, respectively, remove initially identified prospects from or add additional prospects of said customer database to the initial set of prospects using said heuristic measure H, until the count of prospects in said initial set of prospects matches said target number of prospects.

41. The computer program product as set forth in claim 40, wherein:
   said data mining program code that identifies includes data mining program code that identifies at least one assigned cluster for each prospect of said initial set of prospects and identifies at least one next-best cluster for each prospect of said initial set of prospects; and,
   said program code that determines the final selection of prospects includes program code for calculating said heuristic measure H by providing:
      a confidence factor (Confidence) which is a measure of certainty that the prospect has been assigned to a best cluster;
      a first score factor (Score1) which is a measure of how well the prospect fits in its assigned cluster; and
      a second score factor (Score2) which is a measure of how well the prospect fits in a next-best cluster.

42. The computer program product as set forth in claim 41, wherein:

the heuristic $H=\text{Confidence}\times\text{Score1}+\text{Score2}$.

43. The computer program product as set forth in claim 42, wherein:
   $0 \leq \text{Confidence} \leq 1$, and 0 is a lowest certainty;
   $0 \leq \text{Score1} \leq 1$, and 0 represents a poorest best fit; and
   $0 \leq \text{Score2} \leq 1$, and 0 represents a poorest next-best fit.

44. The computer program product as set forth in claim 40, wherein said culling process program code includes:
   program code that ranks each prospect of said initial set of prospects by said heuristic measure H; and
   program code that selects prospects from said initial set of prospects in order of H for the final selection of prospects until the target number is matched.

45. The computer program product as set forth in claim 44, wherein the program code that selects prospects from the initial set in order of H includes program code that selects prospects from the initial set in descending order of H.

46. The computer program product as set forth in claim 40, wherein said culling process program code includes:
   program code that creates one or more sub-clusters of the initial set by utilizing said data mining technique;
   program code that ranks the sub-clusters by a respective potential for the promotion;
   program code that selects from the sub-clusters in descending order of potential for the final selection of prospects until the target number is matched or would be exceeded by the last-selected sub-cluster; and
   when the target number is not matched:
      program code that ranks each prospect of a particular sub-cluster by said heuristic measure H; and
      program code that selects prospects from the particular sub-cluster in order of H for the final selection of prospects until the target number is matched.

47. The computer program product as set forth in claim 46, wherein:
   the program code that selects prospects from the particular sub-cluster in order of H includes program code that selects prospects from the particular sub-cluster in descending order of H.

48. The computer program product as set forth in claim 46, wherein:
   the program code that ranks each prospect of a particular sub-cluster by said heuristic measure H includes program code that ranks each prospect of the last-selected sub-cluster by said heuristic measure H.

49. The computer program product as set forth in claim 40, wherein said augmenting process program code includes:
   program code that ranks prospects of the database not selected for inclusion in the initial set of prospects by said heuristic measure H as ranked prospects; and
   program code that selects from the ranked prospects and adds the selected ranked prospects to the initial set in order of H for the final selection of prospects until the target number is matched.

50. The computer program product as set forth in claim 49, wherein the program code that selects prospects for addition to the initial set from the remaining prospects in order of H includes program code that selects prospects for addition to the initial set from the remaining prospects in descending order of H.

51. The computer program product as set forth in claim 40, wherein said augmenting process program code includes:
   program code that creates one or more sub-clusters of the remaining non-selected database prospects by data mining;
   program code that ranks the sub-clusters by a respective potential for the promotion;
   program code that selects from the sub-clusters in descending order of potential for addition to the initial set as the final selection of prospects until the target number is matched or would be exceeded by the last-selected sub-cluster; and
   when the target number is not matched:
      program code that ranks each prospect of a particular sub-cluster by a heuristic measure H; and
      program code that selects prospects from the particular sub-cluster in order of H for addition to the initial set as the final selection of prospects until the target number is matched.

52. The computer program product as set forth in claim 51, wherein:
   the program code that selects prospects from the particular sub-cluster in order of H includes program code that selects prospects from the particular sub-cluster in descending order of H.

53. The computer program product as set forth in claim 51, wherein:
   the program code that ranks each prospect of a particular sub-cluster by a heuristic measure H includes program code that ranks each prospect of the last-selected sub-cluster by a heuristic measure H.

54. The computer program product as set forth in claim 40, wherein:
   said culling process program code includes:
      program code that ranks each prospect of the initial set by a heuristic measure H; and
      program code that selects prospects from the initial set in order of H for the final selection of prospects until the target number is matched; and,
   said augmenting process program code includes:
      program code that ranks each remaining prospect of the database not selected for the initial set by a heuristic measure H; and
      program code that selects prospects for addition to the initial set from the remaining prospects in descending order of H for the final selection of prospects until the target number is matched.

55. The computer program product as set forth in claim 54 wherein the heuristic H comprises:
   a confidence factor (Confidence) which is a measure of certainty that the prospect has been assigned to a best cluster;
   a first score factor (Score1) which is a measure of how well the prospect fits in its assigned cluster; and a second score factor (Score2) which is a measure of how well the prospect fits in a next-best cluster.

56. The computer program product as set forth in claim 55, wherein:

the heuristic $H = \text{Confidence} \times \text{Score1} \div \text{Score2}$.

57. The computer program product as set forth in claim 56, wherein:

$0 \leq \text{Confidence} \leq 1$, and 0 is a lowest certainty;

$0 \leq \text{Score1} \leq 1$, and 0 represents a poorest best fit; and $0 \leq \text{Score2} \leq 1$, and 0 represents a poorest next-best fit.

* * * * *